Dec. 16, 1941.   E. L. D'OUVILLE ET AL   2,266,011
PRODUCTION OF ISOBUTANE FROM NORMAL BUTANE
Filed Dec. 14, 1938
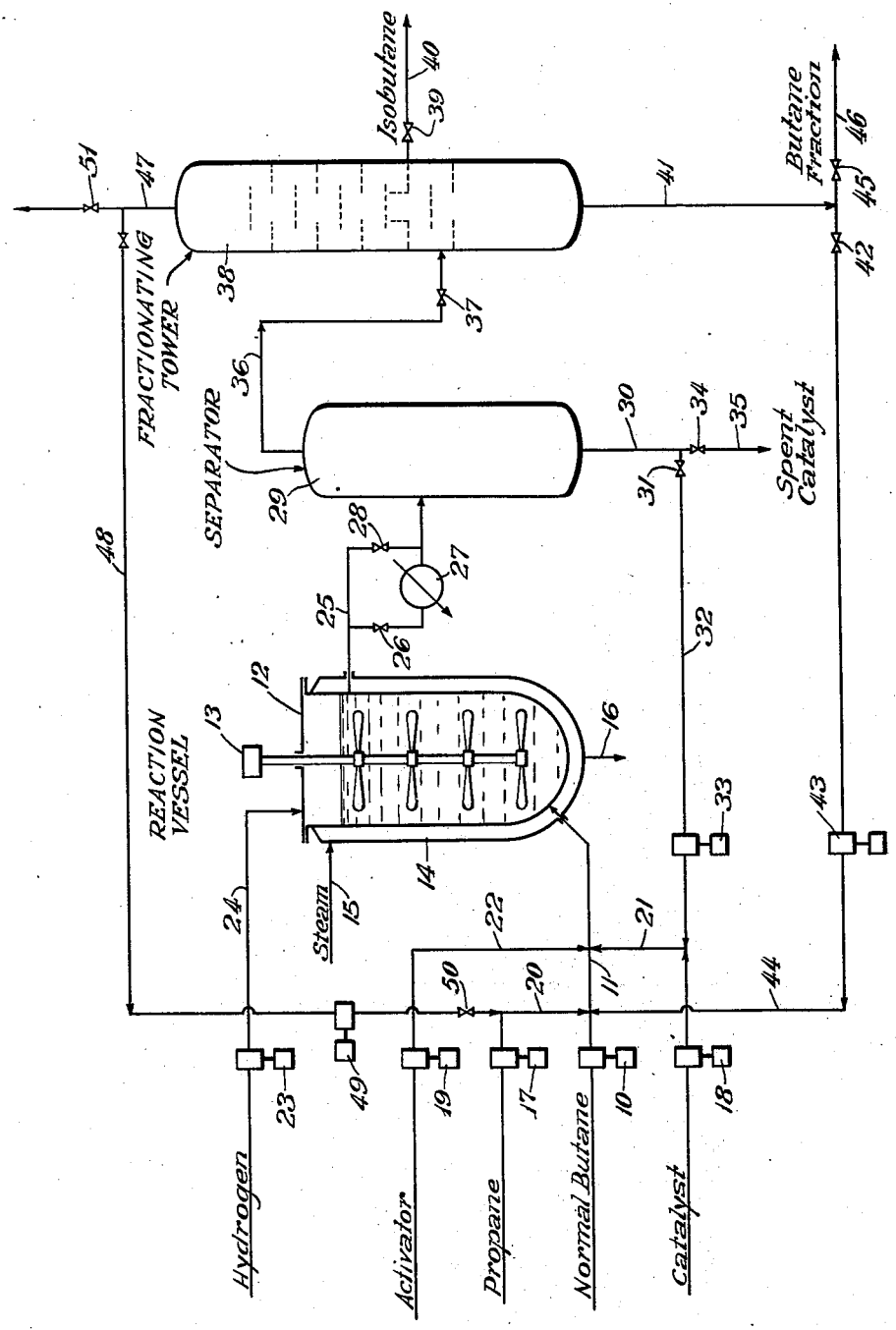
INVENTORS:
Edmond L. d'Ouville
Bernard L. Evering
By Clarence H. Seeley.
ATTY.

Patented Dec. 16, 1941

2,266,011

UNITED STATES PATENT OFFICE 2,266,011

PRODUCTION OF ISOBUTANE FROM NORMAL BUTANE

Edmond L. d'Ouville and Bernard L. Evering, Chicago, Ill., assignors to Standard Oil Company, Chicago, Ill., a corporation of Indiana Application December 14, 1938, Serial No. 245,571

11 Claims. (Cl. 260—676)

This invention relates to the production of isobutane from normal butane and more particularly to the isomerization of normal butane and hydrocarbon fractions containing a large proportion thereof into products consisting predominantly of isobutane in the presence of a catalyst of the aluminum chloride type.

Isobutane is a key material for the preparation of hydrocarbon products which have a premium value as well as other types of chemical materials. For example, the isobutane can be alkylated with olefins such as propylene, butylene, or gases containing them in the presence of suitable catalysts such as sulfuric acid to produce higher isoparaffins of excellent antiknock and stability characteristics, or it can be dehydrogenated to isobutylene over a catalyst such as chromic oxide gel or magnesium chromite and the isobutylene polymerized by known means to resins, lubricating oils or di-isobutylene. The latter compound is of course easily converted to so-called iso-actane by hydrogenation, and the dehydrogenation step is a convenient source of hydrogen for the hydrogenation of the di-isobutylene, or this hydrogen can be used in carrying out the isomerization of normal butane according to our invention.

Other investigators have proposed methods of producing isobutane from normal butane using aluminum chloride as the catalyst, but these methods result in such low yields based on the catalyst consumed that they are much too expensive for practical use and have never been carried out on a commercial scale. Aluminum chloride very readily forms a complex with the hydrocarbon material present, and the rapid degradation of this complex to an inactive sludge has been an important factor in the low yields obtained by prior methods. Even more important has been the rapid decomposition of the normal butane to propane and lighter hydrocarbons at the relatively high temperatures necessary to cause the reaction to proceed at a reasonably high rate.

We have found that excellent yields of isobutane can be obtained from normal butane by subjecting it at relatively high temperatures and pressures to the action of a catalyst of the aluminum chloride type in the presence of an activator and propane, and preferably also in the presence of free hydrogen.

It is an object of our invention to provide a process for the production of isobutane with high yields per unit of catalyst consumed from normal butane and hydrocarbon fractions containing large proportions of normal butane. Another object is to provide an economical method of preparing a product consisting substantially of isobutane by the isomerization of normal butane. Other objects, advantages and uses of our invention will appear from the following detailed description read in conjunction with the drawing which forms a part of this specification and which shows in a schematic manner an apparatus suitable for carrying out our invention.

In one of its broad aspects our invention comprises the treatment of hydrocarbon fractions containing a large proportion of normal butane in the presence of a catalyst of the aluminum chloride type at an elevated temperature, e. g., about 250° F. to about 550° F., preferably 350° F. to 475° F., and an elevated pressure, e. g., about 500 to about 6000 pounds per square inch, with the addition of an activator and propane.

The feed stock to our process can be relatively pure normal butane, but generally essentially saturated hydrocarbon fractions composed predominantly of the butane and containing a large proportion of normal butane are preferred since they are much more readily available. Suitable charging stocks, for example, are the butane obtained by fractionating the natural gasoline recovered from natural gas by conventional methods, and the residual gas from a catalytic polymerization or alkylation unit operated on a "plant butane" cut, the olefins in the cut being substantially completely removed by the polymerization or alkylation. A relatively small amount of the olefins can be tolerated in the reaction, but the butane fraction charged is preferably substantially completely saturated.

The catalyst used in carrying out our invention can be for example aluminum chloride or aluminum bromide and is preferably introduced into the reaction zone in the form of a slurry or solution, for instance in a portion of the feed stock. Furthermore the catalyst complex formed during the reaction retains its activity for a considerable period of time and is useful for further conversion of normal butane. The amount of catalyst which may be used lies in the range from 0.1 to 10.0% and is preferably from 1.0 to 5.0% by weight of the normal butane charged. As activator we can use a hydrogen halide or any compound which in the presence of the catalyst yields a hydrogen halide under the reaction conditions, preferably in an amount sufficient to supply about 0.03 to 3.0 per cent by weight of hydrogen halide based on the charge. Our preferred activator is hydrogen chloride, but hydrogen bromide, carbon tetrachloride or tetrabromide, the alkyl halides such as methyl chloride or bromide, ethyl chloride or bromide, etc., can be used. In general the chlorinated and brominated hydrocarbons, particularly the more volatile ones, are suitable.

An important feature of our invention is the carrying out of the reaction at relatively high temperatures and pressures, namely, about 250° F. to about 550° F. or preferably 350° F. to 475° F. and 500 to 6000 pounds per square inch. Under these conditions much higher conversions per weight of catalyst are obtained in appreciably reduced reaction times than can be obtained under milder conditions.

As stated above, high temperature operation in the presence of catalyst and activator alone causes excessive degradation of the normal butane to lighter hydrocarbons, principally propane. We have found that the formation of propane can be substantially completely inhibited and the yield of isobutane greatly increased by carrying out the reaction in the presence of a substantial amount of propane, for instance 10% to 50% by weight based on the normal butane present. The amount of the latter converted per pass is preferably held below about 35 to 40%. This limitation of the conversion is controlled by regulation of the temperature and/or contact time in the reaction zone or by variation of the quantity of catalyst used. Methane and ethane are without effect in preventing the degradation of the butanes to lighter gases and are generally undesirable since they act as diluents for the reaction mixture but minor quantities can, of course, be present.

As hereinabove stated we prefer to carry out the reaction in the presence of free hydrogen. At the relatively high temperatures at which the reaction is carried out according to our invention, hydrogen greatly retards the rate of deactivation of the catalyst which may occur from the formation of small amounts of lighter gases. Especially high yields of isobutane per unit of catalyst are thereby obtained.

It is apparent that the process of our invention can be carried out either batch-wise or continuously, although we prefer continuous operation, and that certain portions of the apparatus must be constructed of corrosion-resistant materials to prevent rapid deterioration thereof from the active halogen compounds present. Iron-compound impurities should be eliminated from the reaction zone as far as possible. Ferric oxide, for example, definitely lowers the amount of conversion. We have also found that the use of iron and carbon-steel reactors greatly decreases the amount of conversion obtainable, so that it is preferred that the reaction vessels be constructed of or lined with non-ferrous materials such as glass, ceramic substances, aluminum, etc., or corrosion-resistant alloys such as stainless steel. In the case of stainless steel containing 18% chromium and 8% nickel, it was found that a somewhat greater amount of activator was necessary in order to obtain yields of products comparable with those obtained in glass apparatus, but the cost of the additional activator may be balanced against the greater durability of stainless steel equipment.

Our invention will now be described in more detail in connection with the apparatus shown in the drawing. Normal butane or paraffinic gas containing normal butane is introduced into the system by means of pump 10 and line 11 and thence passes into the lower portion of reaction vessel 12 which is shown as a jacketed pressure vessel equipped with a stirring device 13 so that the reaction materials are thoroughly contacted. The desired reaction temperature is maintained by passing a suitable gaseous or liquid heating agent through jacket 14 of reaction vessel 12 by means of inlet 15 and outlet 16. Propane, catalyst slurry and activator are introduced into line 11 and mixed with the feed therein by means of pumps 17, 18 and 19, and lines 20, 21 and 22 respectively. Free hydrogen is supplied to the upper portion of reaction vessel 12 through pump 23 and line 24, and is there maintained at the desired reaction pressure, which is sufficiently high to cause the hydrogen to dissolve in the agitated reaction mixture at a rate at least as great as it is used up in the reaction. Obviously if desired a number of reaction vessels can be used in series or parallel in place of the one shown, or vessels of other types well-known in the art can be substituted therefor.

A portion of the entire reaction mixture is continuously withdrawn from the upper portion of vessel 12 through line 25 and passes either through valve 26 and cooler 27 or through by-pass valve 28 or partly through each valve into separator 29. The products consist of a catalyst complex which settles out in the lower portion of separator 29 and an upper layer consisting of a mixture of isobutane, propane, unreacted normal butane and some dissolved hydrogen. The catalyst complex is continuously withdrawn from separator 29 through line 30 and either recycled to line 21 through valve 31, line 32 and pump 33 or withdrawn from the system through valve 34 and line 35, or under some conditions a portion of the complex may be continuously withdrawn from the system and the remainder recycled. The substantially spent complex can, of course, be regenerated or the aluminum halide recovered therefrom and reintroduced into the system through pump 18.

The upper layer is removed from separator 29 through line 36 and passed through valve 37 into fractionator 38 which is so arranged and operated that a fraction rich in isobutane is obtained as a liquid sidestream which is withdrawn through valve 39 and line 40, and the propane and lighter gases are taken overhead. The fraction collecting at the bottom of fractionating tower 38 is rich in normal butane and is withdrawn through line 41 and preferably returned to line 11 for further treatment through valve 42 by means of pump 43 and line 44. Obviously the entire liquid butane fraction can be withdrawn from the system for use or further fractionation if desired, and this can be done by closing valves 39 and 42 and opening valve 45 in line 46.

The overhead from tower 38 which consists essentially of hydrogen and propane passes through line 47 and is preferably recycled to line 20 through line 48, pump 49 and valve 50 to inhibit the conversion of the butane feed into lighter gases and reduce the quantity which must be introduced from outside the system. During this procedure, of course, valve 51 controlling a vent is at least partly closed, but this valve will generally be opened only as long as required to prevent the very small amount of methane and ethane which may be formed from building up in the system.

From the above, it can readily be seen that we have provided an improved method of isomerizing normal butane to isobutane whereby the decomposition of the feed stock to lighter gases, which is a prominent and disadvantageous feature of prior processes, is substantially completely eliminated.

Many modifications of our invention and of the apparatus shown herein for practicing it will be apparent to those skilled in the art, and they will be able to supply numerous details not illustrated in the drawing, such as heat exchangers, provisions for fractionating tower control, etc. We do not, therefore, desire to be limited to the specific modifications used in illustrating our invention, but only by the scope of the following claims.

We claim:

1. The method of converting normal butane to isobutane which comprises contacting in a reaction zone maintained at an elevated temperature in the range from about 250° F. to about 550° F. an admixture of normal butane, propane, an aluminum halide catalyst effective in causing said conversion and an activator for said catalyst, the reacting hydrocarbon gases present being substantially free from unsaturated hydrocarbons and the amount of propane present being in the range from about 10% to about 50% by weight based on the normal butane undergoing treatment.

2. The method of converting normal butane to isobutane according to claim 1 wherein said reaction zone is maintained under a pressure in the range from about 500 to about 6000 pounds per square inch.

3. The method of converting normal butane to isobutane according to claim 1 wherein said elevated temperature lies in the range from about 350° F. to about 475° F. and said reaction zone is maintained under a pressure in the range from about 500 to about 6000 pounds per square inch.

4. In the isomerization of normal butane by treatment with an aluminum halide catalyst effective in converting normal butane to isobutane and an activator for said catalyst at a temperature in the range from about 250° F. to about 550° F., the improvement which comprises carrying out said treatment in the presence of about 10% to 50% of propane by weight based on the normal butane undergoing treatment.

5. In the isomerization of normal butane by treatment with an aluminum halide catalyst effective in converting normal butane to isobutane and an activator for said catalyst at a temperature in the range from about 250° F. to about 550° F., the improvement which comprises carrying out said treatment in the presence of free hydrogen and about 10% to 50% of propane by weight based on the normal butane undergoing treatment.

6. The process of converting substantial amounts of the normal butane in a paraffinic gas fraction rich in the same into isobutane which comprises contacting in a reaction zone maintained at a temperature in the range from about 250° F. to about 550° F. and under superatmospheric pressure an admixture of said gas fraction, an aluminum chloride catalyst and a compound affording a hydrogen halide under the reaction conditions, said contacting step being carried out in the presence of an amount of propane lying in the range from about 10% to about 50% by weight based on the normal butane undergoing treatment.

7. The method of converting normal butane to isobutane which comprises contacting in a reaction zone maintained at an elevated temperature in the range from about 250° F. to about 550° F. an admixture of normal butane, propane, an aluminum halide catalyst effective in causing said conversion and an activator for said catalyst, the reacting hydrocarbon gases present being substantially free from unsaturated hydrocarbons and the amount of propane present being in the range from about 10% to about 50% by weight based on the normal butane undergoing treatment, withdrawing the products from said reaction zone, separating a fraction rich in isobutane and a fraction rich in normal butane from said products, and returning at least a portion of said fraction rich in normal butane to said reaction zone.

8. The method of converting normal butane to isobutane which comprises contacting in a reaction zone maintained at an elevated temperature in the range from about 250° F. to about 550° F. an admixture of normal butane, propane, an aluminum halide catalyst effective in causing said conversion and an activator for said catalyst, the reacting hydrocarbon gases present being substantially free from unsaturated hydrocarbons and the amount of propane present being in the range from about 10% to about 50% by weight based on the normal butane undergoing treatment, withdrawing the products from said reaction zone, separating a gaseous fraction rich in propane from said products and returning at least a portion of said gaseous fraction to said reaction zone.

9. The method of converting normal butane to isobutane which comprises contacting in a reaction zone maintained at an elevated temperature in the range from about 250° F. to about 550° F. an admixture of normal butane, propane, an aluminum halide catalyst effective in causing said conversion and an activator for said catalyst, the reacting hydrocarbon gases present being substantially free from unsaturated hydrocarbons and the amount of propane present being in the range from about 10% to about 50% by weight based on the normal butane undergoing treatment, withdrawing the products from said reaction zone, separating a catalyst-containing portion and at least one hydrocarbon fraction from said products, and returning at least a portion of said catalyst-containing portion to said reaction zone.

10. The process of converting normal butane to isobutane which comprises subjecting a substantially saturated hydrocarbon fraction containing a preponderance of normal butane to the action of anhydrous aluminum chloride and hydrogen chloride at a temperature in the range from about 350° F. to about 475° F. and a pressure in the range from about 500 to about 6000 pounds per square inch in the presence of free hydrogen and propane in an amount lying within the range from about 10% to about 50% by weight based on the normal butane undergoing treatment and sufficient to inhibit substantially completely the decomposition of said normal butane to lighter gases.

11. The process of increasing the isobutane concentration of a substantially saturated mixture of hydrocarbons containing a large proportion of normal butane which comprises thoroughly contacting said mixture with about 0.1% to 10% by weight of anhydrous aluminum chloride, hydrogen chloride, and from 10% to 50% by weight of propane in the presence of free hydrogen in a reaction zone maintained at a temperature of about 250° F. to about 550° F. and a pressure of about 500 to about 6000 pounds per square inch, removing the reaction products from said reaction zone, separating said reaction products into a catalyst-containing portion and a hydrocarbon portion, returning at least a part of said catalyst-containing portion to said reaction zone, fractionating said hydrocarbon portion into a relatively heavy fraction having a high normal butane content, an intermediate fraction having a high isobutane content and a relatively light fraction containing the hydrocarbons having less than four carbon atoms per molecule, and returning at least a portion of said relatively light fraction and of said relatively heavy fraction to said reaction zone.

EDMOND L. D'OUVILLE.
BERNARD L. EVERING.